United States Patent
Lee (10) Patent No.: US 9,876,239 B2
(45) Date of Patent: Jan. 23, 2018

(54) FUEL CELL SYSTEM AND METHOD FOR CONTROLLING THE SAME

(71) Applicant: Hyundai Motor Company, Seoul (KR)

(72) Inventor: Dong Hun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 375 days.

(21) Appl. No.: 14/550,933

(22) Filed: Nov. 22, 2014

(65) Prior Publication Data

US 2015/0364778 A1  Dec. 17, 2015

(30) Foreign Application Priority Data

Jun. 13, 2014  (KR) .................. 10-2014-0072155

(51) Int. Cl.
| | |
|---|---|
| *H01M 8/04089* | (2016.01) |
| *H01M 8/04291* | (2016.01) |
| *H01M 8/04828* | (2016.01) |
| *H01M 8/04119* | (2016.01) |
| *H01M 8/0438* | (2016.01) |
| *H01M 8/04746* | (2016.01) |

(52) U.S. Cl.
CPC ... *H01M 8/04104* (2013.01); *H01M 8/04141* (2013.01); *H01M 8/04291* (2013.01); *H01M 8/04425* (2013.01); *H01M 8/04753* (2013.01); *H01M 8/04835* (2013.01); *H01M 2250/20* (2013.01); *Y02T 90/32* (2013.01)

(58) Field of Classification Search
CPC ........................................ H01M 8/04
USPC ......................................... 429/446
See application file for complete search history.

(56) References Cited

U.S. PATENT DOCUMENTS

| | | | |
|---|---|---|---|
| 7,514,171 B2 | 4/2009 | Rainville et al. | |
| 8,450,019 B2 | 5/2013 | Andreas-Schott et al. | |
| 2002/0164509 A1* | 11/2002 | Wheat ............... | H01M 8/04126 429/413 |
| 2005/0112424 A1* | 5/2005 | Hirano ................ | B60L 11/1885 429/415 |
| 2006/0263651 A1* | 11/2006 | Fagley ............. | H01M 8/04007 429/413 |
| 2010/0151294 A1 | 6/2010 | Rainville et al. | |

(Continued)

FOREIGN PATENT DOCUMENTS

| | | |
|---|---|---|
| JP | 2007-242547 A | 9/2007 |
| JP | 2014-011090 A | 1/2014 |

(Continued)

*Primary Examiner* — James Lee
(74) *Attorney, Agent, or Firm* — Mintz Levin Cohn Ferris Glovsky and Popeo, P.C.; Peter F. Corless (57) ABSTRACT

A fuel cell system and a method for controlling the fuel cell system are provided. The fuel cell system includes a compressor that is configured to supply air and a humidifier that includes a supply portion connected to the compressor and an air supply pipe to supply moisture to the supplied air and supply the humidified air to a fuel cell stack. An exhaust portion is configured to receive air exhausted from the fuel cell stack, discharge moisture from the received air to the supply portion, and discharge moisture-deprived air to an exhaust pipe. A valve installed in the air supply pipe is disposed between the compressor and the humidifier and a bypass pipe which branches off at the valve is connected to the exhaust pipe.

5 Claims, 4 Drawing Sheets

(56) References Cited

U.S. PATENT DOCUMENTS

| | | | | |
|---|---|---|---|---|
| 2011/0008689 A1* | 1/2011 | Milacic | ............ | H01M 8/04126 |
| | | | | 429/413 |
| 2013/0022884 A1* | 1/2013 | Andreas-Schott | .. | F16K 11/0525 |
| | | | | 429/413 |
| 2015/0030953 A1* | 1/2015 | Asai | ................. | H01M 8/04089 |
| | | | | 429/446 |

FOREIGN PATENT DOCUMENTS

| | | | | |
|---|---|---|---|---|
| KR | 10-2009-0074093 | | 7/2009 | |
| WO | WO 2013/129521 | * | 9/2013 | .............. H01M 8/04 |

* cited by examiner

FIG. 1

RELATED ART

FUEL CELL SYSTEM AND METHOD FOR CONTROLLING THE SAME

CROSS REFERENCE TO RELATED APPLICATION

The present application claims priority to Korean Patent Application No. 10-2014-0072155, filed on Jun. 13, 2014, the entire contents of which is incorporated herein for all purposes by this reference.

TECHNICAL FIELD

The present invention relates to a fuel cell system and a method for controlling the fuel cell system that controls humidity of air supplied to a fuel cell stack.

BACKGROUND

A polymer electrolyte membrane fuel cell system has been widely used for vehicles. In the polymer electrolyte membrane, water is used to transfer hydrogen ions ($H^+$) to a membrane disposed between an air electrode and an anode, and a predetermined level of water is maintained within the electrolyte membrane, which is related to performance of a fuel cell.

Under a dry condition in which water is supplied less than the predetermined level, the water content in the electrolyte membrane decreases, which increases resistance of an electrode and deteriorates performance of a fuel cell. Under a flooding condition in which the amount of water is supplied greater than the predetermined level, water vapor may condense in channels through which air and hydrogen gas are supplied to an air electrode and an anode, respectively, and reaction gases may not be supplied to the electrodes, thereby causing substantial drop of a cell voltage of the fuel cell.

In the related art, a conventional method is provided to adjust pressures and supercharging ratios of air and hydrogen gas which are supplied to a fuel cell according to water content in an electrode of a fuel cell or the humidity in the supplied air. Although the method of adjusting the pressure of air has been used effectively, the effect may be insufficient since a range of pressure of air supplied by a compressor or blower may be limited based on surging and chocking conditions and flow rates of air.

Further, in a conventional method of controlling water content in an electrode-membrane, the pressure of air may be elevated and supercharging ratios may be reduced in dry conditions of the fuel cell stack, and the pressure of air may be reduced and the super charging ratios may be elevated in flooding conditions containing high water content in the fuel cell stack.

Such control may be performed based on the following assumptions. Since the saturation vapor pressure of water depends on a temperature, a partial pressure of vapor may be constant at a specific temperature and humidity. Accordingly, when the pressure of supplied air is elevated, the amount of water per unit mass of air to maintain the predetermined level of humidity may decrease. As such, the humidity of supplied air may increase with a decreased amount of water. On the other hand, when the pressure of supplied air is reduced, the amount of water to maintain the predetermined level of humidity may increase.

Figure 1:
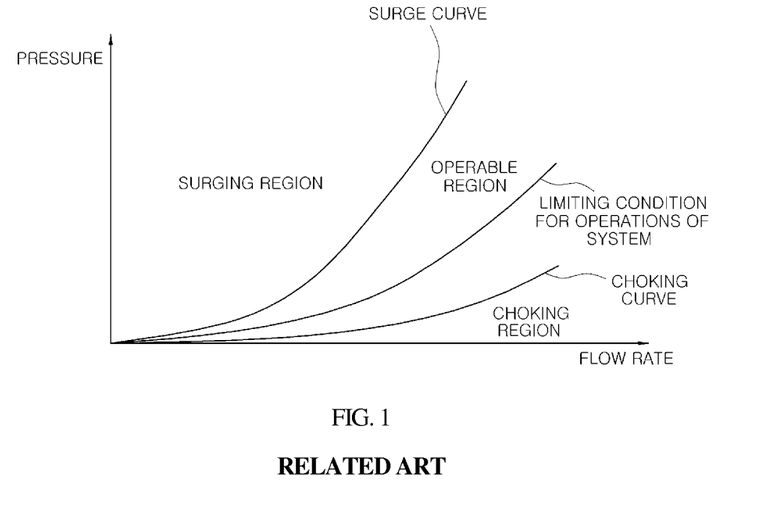
FIG. 1 shows a performance curve of an exemplary compressor in the related art.

FIG. 1 shows a performance curve of an exemplary compressor in the related art. a compressor is used to supply air to an air electrode of a fuel cell. The compressor can control the pressure and flow rate of air only within operable ranges due to surging and choking. The operable ranges are directed to an area below the surge curve and above the choking curve in FIG. 1. As illustrated in FIG. 1, according to the related art, the control of the pressure and flow rate of air may be conducted within the operable ranges when the water content in a fuel cell is adjusted the pressure and flow rate of the supplied air. Therefore, the effect may insufficient. Particularly, when the flow rate of air supplied to a fuel stack is reduced, the pressure of air may not be elevated to pressures which are beyond points of the surge curve of FIG. 1 due to the limitation of a system. Furthermore, the pressure of air may be controlled within a limited pressure range under the conditions of the operable range below the surge curve since a minimum operation curve may be determined by a back pressure applied to parts connected to a pipe extended to an air electrode.

The foregoing is intended merely to aid in the understanding of the background of the present invention, and is not intended to mean that the present invention falls within the purview of the related art that is already known to those skilled in the art.

SUMMARY

The present invention provides a fuel cell system and a method for controlling the fuel cell system, which rapidly and more accurately control humidity of air to be supplied to a fuel cell stack in the fuel cell system.

In one aspect, a fuel cell system for a vehicle may include: a compressor configured to compress air to be supplied to a fuel cell stack; a valve installed in an air supply pipe connected from the compressor to the fuel cell stack; a bypass pipe that branches off at the valve and is connected to the exhaust pipe of the fuel cell stack; and a controller configured to increase a pressure of air supplied from the compressor and exhaust a portion of air via the bypass pipe by operating the valve, particularly, when it is necessary to elevate the pressure of air supplied from the compressor to a level of pressure over a point on a surge curve.

The fuel cell system may further include a humidifier, which may be installed downstream from the valve of the air supply pipe. The humidifier may include: a supply portion which may be connected to the compressor and an air supply pipe to supply moisture to the supplied air and may be configured to supply the humidified air to a fuel cell stack; and an exhaust portion which may be configured to receive an air exhausted from the fuel cell stack, supply moisture from the received air to the supply portion, and discharge the air to an exhaust pipe.

In response to determining to increase a target pressure of a compressed air to a pressure over a point on the surge curve of the compressor when air is supplied to the fuel cell stack at a controlled flow rate, the controller may be configured to operate the compressor to supply air from the compressor at a flow rate greater than the controlled flow rate and operate the valve to exhaust a portion of air through the bypass pipe. As such, both of the adjusted flow rate of air supplied to the fuel cell tack and the target pressure of the compressed air may be satisfied. As used herein, the term "target pressure" refers to a pressure of supplied air to maintain the predetermined level of humidity.

Another aspect of the present invention provides a method for controlling the fuel cell system. The method may include: comparing a target pressure of a compressed air supplied from the compressor with a pressure of the surge curve of the compressor; and exhausting a portion of the air through a bypass pipe by operating the valve when the target pressure is greater than the pressure of the surge curve.

During exhausting the air, a flow rate of the compressed air supplied from the compressor may be increased to the level that a pressure of the compressor may reach the target pressure, and a portion of air may be exhausted through the bypass pipe by opening the valve by a degree that corresponds to a difference between an adjusted flow rate of the air supplied to the fuel cell stack and a flow rate of the compressed air supplied from the compressor.

The method may further include: calculating the adjusted flow rate of the air supplied to the fuel cell stack and the target pressure of the compressed air supplied from the compressor; and the target pressure may be compared with a limiting pressure. As used herein, the term "limiting pressure" refers to a pressure value or point on the surge curve at the controlled flow rate in the comparing the pressures in FIG. 1.

During exhausting the air, when the target pressure is greater than the limiting pressure, the valve may be operated to exhaust a portion of air through the bypass pipe. Furthermore, during exhausting the air, the flow rate of the air supplied from the compressor may be increased to the level that the limiting pressure may reach the target pressure and a portion of air may be exhausted through the bypass pipe by opening the valve by a degree that corresponds to a difference between the adjusted flow rate of air supplied to the fuel cell stack and the flow rate of the compressed air supplied from the compressor.

According to various exemplary embodiments of the present invention, the fuel cell system and the method for controlling the fuel cell having structures as described above, the water content in an electrode-membrane of a fuel cell may be effectively adjusted by varying the pressure and flow rate of air supplied to a fuel cell. In addition, durability and performance of a fuel cell may be improved by maintaining a condition in which the predetermined level of humidity in an electrode-membrane may be maintained. Moreover, even in a substantially high temperature operation condition where operations of a fuel cell system may be limited, the performance of the fuel cell may be maintained by effectively adjusting the humidity of air supplied to the fuel cell. Furthermore, performance in a severe operating condition such as a substantially high temperature, high speed, and gradeability condition may be satisfied.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described with reference to the accompanying drawings.

Figure 2:
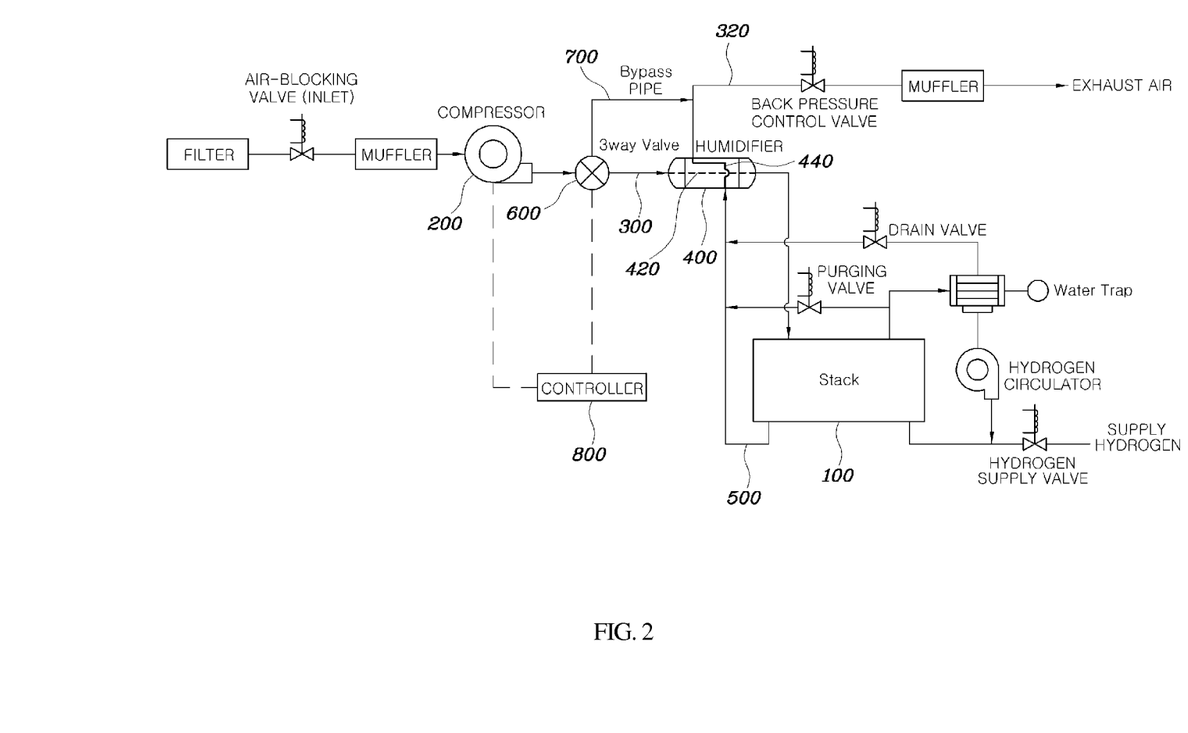
FIG. 2 illustrates an exemplary fuel cell system for a vehicle according to an exemplary embodiment of the present invention.
Figure 3:
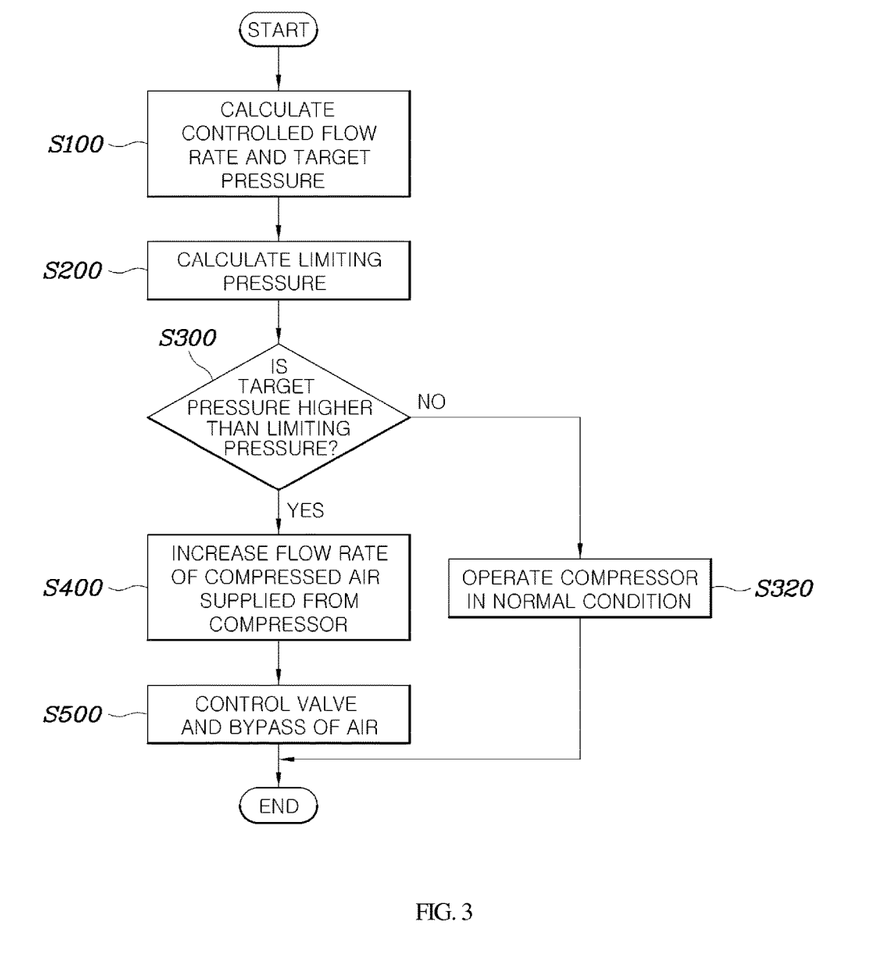
FIG. 3 shows an exemplary method for controlling an exemplary fuel cell system for a vehicle according to an exemplary embodiment of the present invention.
Figure 4:
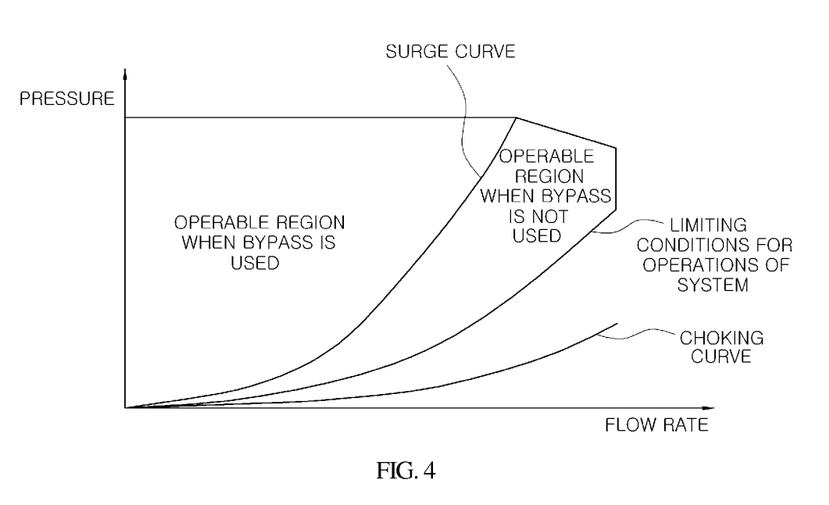
FIG. 4 shows a performance curve of an exemplary compressor of an exemplary fuel cell system for a vehicle according to an exemplary embodiment of the present invention.

FIG. 2 illustrates an exemplary fuel cell system for a vehicle according to an exemplary embodiment of the present invention; FIG. 3 shows an exemplary method for controlling an exemplary fuel cell system for a vehicle according to an exemplary embodiment of the present invention; and FIG. 4 shows a performance curve of an exemplary compressor of an exemplary fuel cell system for a vehicle according to an exemplary embodiment of the present invention.

In FIG. 2, an exemplary fuel cell system for a vehicle may include: a compressor 200 configured to supply air; a humidifier 400 that may include a supply portion 420 connected to the compressor 200 and an air supply pipe 300, and configured to supply moisture to the supplied air, and supply the humidified air to a fuel cell stack, and an exhaust portion 440 configured to receive an air exhausted from the fuel cell stack 100, discharge moisture from the received air to the supply portion 420 and discharge the remaining air to an exhaust pipe 320; a valve 600 installed in the air supply pipe 300 connected between the compressor 200 and the humidifier 400; and a bypass pipe 700 which branches off at the valve 600 and is connected to the exhaust pipe 320.

In certain exemplary embodiments, a fuel cell vehicle may include the basic configuration of an exemplary fuel cell as illustrated in FIG. 2. In the present exemplary embodiment, a valve, a bypass pipe, and a controller 800 configured to operate the valve may be further included in the basic configuration.

In particular, a three-way valve and a bypass pipe may be connected to an air supply pipe through which air may be supplied to an air electrode of a fuel cell, thereby providing a desired proportion of the air supplied from the compressor by bypassing to the fuel cell stack. As such, the pressure and flow rate of air supplied to the fuel cell stack may be adjusted and surging and choking conditions of the compressor may be avoided, such that a more effective and rapid control of the humidity of air supplied to the fuel cell may be provided.

The configuration of an exemplary fuel cell system implementing above features is illustrated in FIG. 2. The system may further include: a three-way valve configured to be a pipe connection between a rear end of a compressor and an inlet of an air electrode of a fuel cell stack; and a bypass pipe which branches off at the three-way valve and is connected to a pipe connected between an outlet of the air electrode of the fuel cell stack and a humidifier. By using the three-way valve and the bypass pipe, a flow of air supplied from the air compressor may be divided into a flow of air which flows to the inlet and a flow of air which follows to the outlet of the air electrode of the fuel cell stack. Moreover, the pressure of the air compressed by and supplied from the compressor may be increased while supplying air to a fuel cell stack at a reduced flow rate. In an exemplary embodiment as illustrated in FIG. 2, the bypass pipe may be connected to the rear end of the humidifier disposed on the outlet side of the air electrode. When the bypass pipe is alternatively connected to a pipe between the outlet of the air electrode of the fuel cell stack and the humidifier the humidity of air on the exhaust side of the humidifier may be reduced, thereby lowering the performance of the humidifier. Thus, as the bypass pipe may be installed to avoid a dry condition in the fuel cell stack by increasing the pressure of the air to be supplied to the air electrode according to the invention, the bypass pipe may be installed as illustrated in FIG. 2.

Moreover, the compressor 200 configured to supply air may be included. The humidifier 400 may include the supply portion 420 and the exhaust portion 440. The supply portion 420 may be connected to the compressor 200 and the air supply pipe 300, and may be configured to supply moisture to the supplied air and then supply the humidified air to the fuel cell stack 100. The exhaust portion 400 may be configured to receive air exhausted from the fuel cell stack 100, discharge moisture from the received air to the supply portion 420, and discharge the exhausted air to the exhaust pipe 320. As such, the humidifier 400 may be configured to supply moisture obtained from the exhausted gas to the air to be supplied to the air electrode. In other words, the humidifier 400 may be configured to provide the humidified air to be supplied to the fuel cell stack 100.

The valve 600 may be installed in the air supply line 300 connected between the compressor 200 and the humidifier 400. The bypass pipe 700 may branch off at the valve and be connected to the exhaust pipe. When the valve 600 is opened, a flow of air may be divided into a flow which flows to the humidifier and a flow of air which flows to the exhaust pipe. When it is determined to increase the pressure of air supplied through the compressor to a predetermined level of pressure over a point on a surge curve, the controller 800 may perform controlling of exhausting a portion of air through the bypass pipe by controlling the valve 600.

In particular, in response to determining to increase a target pressure of air to a pressure over a point on the surge curve of the compressor under a condition in which air is supplied to the fuel cell stack at an adjusted flow rate of the air, the controller 800 may be configured to operate the compressor to supply air through the compressor at a flow rate greater than the controlled flow rate. In addition, the controller 800 may be configured to operate the valve to exhaust a portion of air supplied from the compressor through the bypass pipe, thereby satisfying both of the adjusted flow rate of air supplied to the fuel cell stack and the target pressure of air supplied from the compressor.

FIG. 3 illustrates processes of an exemplary method executed by a controller for controlling an exemplary fuel cell system according to an exemplary embodiment of the present invention. The method for controlling the fuel cell system may include: comparing the target pressure of air supplied from the compressor with a pressure of the surge curve of the compressor (S300); and exhausting air through the bypass pipe by operating the valve when the target pressure is greater than the pressure of the surge curve (S500).

In particular, in the process of exhausting air through the bypass pipe, a flow rate of air supplied from the compressor (S400) may be increased to cause the pressure of air supplied from the compressor to reach the target pressure and then to exhaust air through the bypass pipe by opening the valve by a degree that corresponds to a difference between the adjusted flow rate of the air to be supplied to the fuel cell stack and the flow rate of air supplied from the compressor. When the target pressure is less than the limiting pressure, the compressor may operate normally at pressures below the surge curve.

Furthermore the method may include, calculating, the adjusted flow rate and the target pressure. In this calculated, the adjusted flow rate may be a flow rate of air supplied to the fuel cell stack and the target pressure may be a pressure of compressed air supplied from the compressor. In the comparison step (S300), the calculated target pressure may be compared with a limiting pressure corresponding to a point on the surge curve at the adjusted flow rate (S200). In the bypass step S500, when the target pressure is greater than the limiting pressure, the valve may be adjusted such that air may be exhausted through the bypass pipe.

This control may be performed when the fuel cell system is operated in a dry condition. Alternatively, such control may be performed when it is determined to elevate the pressure of air supplied from the compressor to a pressure over a point to the surge curve, since a water content sensor which measures the water content in the electrode-membrane of the fuel cell stack indicates that the electrode-membrane is dry.

In the bypass step, the flow rate of air supplied from the compressor may be increased to until the limiting pressure reaches the target pressure, and air may be exhausted through the bypass pipe by opening the valve by a degree that corresponds to a difference between the controlled flow rate and a flow rate of air supplied from the compressor. According to the control method as described above, air may be compressed to have a desired elevated pressure before it is supplied to the air electrode, and further, at the same time, the flow rate may be reduced to a desired level. Accordingly, a dry condition may be managed effectively and a dry condition may not occur.

In response to determining to perform the control of elevating the pressure of air supplied from the compressor to a pressure over a point of the surge curve due to the fuel cell system operating in a dry condition or due to a water content sensor measuring the water content in the electrode-membrane of the fuel cell stack indicates that the electrode-membrane is dry, a sufficient amount of air may be supplied through the compressor at an elevated flow rate within a range to avoid surging. In particular, a desired amount of air required by the fuel cell may be supplied to the inlet side of the air electrode of the fuel cell stack by operating the three-way valve, and the air supplied through the compressor for elevating the pressure of air may be discharged to the outlet side of the fuel cell stack through the bypass pipe.

Further, since the energy consumed by the compressor may be obtained by a combination of the flow rate of air and a pressure difference between pressures at the inlet and outlet of the compressor and the conditions of the surge curve may lead to a minimum amount of air used at the same pressure, controlling along the surge curve may be a more effective way of adjusting the flow rate of air used to maintain the target pressure.

According to various exemplary embodiments of the present invention, the method of recovering the fuel cell stack from the dry condition may elevate the flow rate of air to increase the pressure of air. Although the method may increase energy consumption by the compressor, the method may be used for currently available fuel cell vehicles when a temperature of a fuel cell stack of the vehicle rises and an electrode-membrane thereof may be dried under a super surging condition of about 40° C.

In the related art, many vehicle manufacturers have used a conventional method of increasing the pressure of air supplied to an air electrode during a high temperature operation using a compressor despite the inefficiency of the method. However, since the upper-limit of the pressure control range of the compressor may be the value of the surge curve, the operation of pressure control may be insufficient at a low output level of a fuel cell and the effect of using the pressure control method may be limited due to the limited operable range and the conventional method has not provided an appropriate solution. However, methods in various exemplary embodiments of the present invention may provide the compressor to supply air having the greater pressure which may be generated by the compressor, regardless of the output level of the fuel cell, under a limiting condition for operations of a system, such as a super-surging condition, thereby providing effective solution for drying-out in the fuel cell stack.

FIG. 4 shows a performance curve of an exemplary compressor of an exemplary fuel cell system according to an exemplary embodiment of the present invention. Accordingly, the ranges of flow rate and pressure of air supplied to an air electrode of a fuel cell may be broadened using the pipeline structures of the present invention. In the section of related art, conventional technologies may adjust the flow rate and pressure of air only within a bypass-unused operable range. In contrast, according to exemplary embodiments of the present invention, in response to determining to elevate the pressure of air supplied from a compressor to a pressure over a point on the surge curve even at a condition in which a flow rate of the air supplied to a fuel cell stack is reduced, a sufficient amount of air with a target pressure may be supplied through the compressor. In particular, a desired amount of air required by a fuel cell stack may be supplied to an inlet side of an air electrode of a fuel cell stack using a three-way valve, and the remaining air may be exhausted to an outlet side of the fuel cell stack through a bypass pipe. Accordingly, the ranges of the pressure and flow rate of air supplied to a fuel cell may be broadened to a bypass-used operable range.

According to various exemplary embodiments of the present invention, the fuel cell system and the methods for controlling the fuel cell having the structure as described above, the water content of an electrode-membrane of the fuel cell may be adjusted effectively by varying the pressure and flow rate of air supplied to the fuel cell.

In addition, durability and performance of a fuel cell may be improved by maintaining a condition in which an optimum water content in an electrode-membrane is provided. Moreover, even at a substantially high temperature operation condition for operating the fuel cell system, the performance of a fuel cell may be maintained effectively by adjusting the humidity of air supplied to the fuel cell. For example, a performance of the fuel cell may be maintained even at a severe operation condition such as high temperature, high speed, and gradeability condition.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell system for a vehicle, comprising:
a compressor configured to compress air to be supplied to a fuel cell stack;
a valve installed in an air supply pipe which is connected from the compressor to the fuel cell stack;
a bypass pipe which branches off at the valve and is connected to an exhaust pipe of the fuel cell stack;
a controller programmed to increase a pressure of the air supplied from the compressor and exhaust a portion of the air through the bypass pipe by operating the valve in response to determining to elevate the pressure of the air supplied from the compressor to a pressure over a point on a surge curve of the compressor when a dry condition of an electrode-membrane of the fuel cell stack is detected; and
a humidifier, which is installed downstream from the valve of the air supply pipe, including: a supply portion which is connected to the compressor and the air supply pipe to supply moisture to the supplied air and supply the humidified air to the fuel cell stack; and an exhaust portion configured to receive air exhausted from the fuel cell stack, supply moisture from the received air to the supply portion, and discharge the exhausted air to an exhaust pipe,
wherein in response to determining to increase a target pressure of compressed air to the pressure over a point on the surge curve of the compressor under a condition in which the air is supplied to the fuel cell stack at an adjusted flow rate of the air, the controller is programmed to operate the compressor to supply the air from the compressor at a flow rate greater than the adjusted flow rate and operate the valve to exhaust a portion of the air through the bypass pipe, to satisfy both of the adjusted flow rate of the air supplied to the fuel cell stack and the target pressure of the air compressed by the compressor, and wherein the controller is programmed to operate the compressor and bypass the air through the valve when the electrode-membrane of the fuel cell stack indicates the dry condition by measure water content.

2. A method for controlling the fuel cell system of claim 1, comprising:

comparing, by a controller, the target pressure of the compressed air to be supplied to the fuel cell stack with the pressure of the surge curve of the compressor to detect the dry condition of the electrode-membrane of the fuel cell stack; and exhausting, by the controller, the portion of air through the bypass pipe by operating the valve when a target pressure is greater than a pressure of the surge curve of the compressor and the dry condition is detected, wherein during the exhausting of the portion of air, a flow rate of the air supplied from the compressor is increased such that the pressure of air supplied from the compressor reaches the target pressure of the compressed air to be supplied to the fuel cell stack and a portion of the air supplied from the compressor is exhausted through the bypass pipe by opening the valve by a degree that correspond to a difference between controlled flow rate of air supplied to the fuel cell stack and the flow rate of the air supplied from the compressor, and wherein the controller is programmed to operate the compressor and bypass the air through the valve when the electrode-membrane of the fuel cell stack indicates the dry condition by measure water content.

3. The method according to claim 2, further comprising:

calculating, by the controller, adjusted flow rate of air supplied to the fuel cell stack and the target pressure of the compressed air supplied to the fuel cell stack, wherein during the comparing, the target pressure is compared with a limiting pressure corresponding to a point on the surge curve at the adjusting flow rate.

4. The method according to claim 3, wherein during the exhausting of the portion of air, the portion of air is exhausted through the bypass pipe by operating the valve when the target pressure of the compressed air to be supplied to the fuel cell stack is greater than the limiting pressure.

5. The method according to claim 3, wherein during the exhausting of the portion of air, the flow rate of the air supplied from the compressor is increased such that that the limiting pressure reaches the target pressure of the compressed air to be supplied to the fuel cell stack and a portion of the air is exhausted through the bypass pipe by opening the valve by a degree that corresponds to a difference between adjusted flow rate and the flow rate of air supplied from the compressor.

* * * * *